No. 762,855. PATENTED JUNE 14, 1904.
D. J. WILLIAMS.
INVESTMENT AND SAVINGS BOOK.
APPLICATION FILED AUG. 6, 1903.
NO MODEL. 3 SHEETS—SHEET 1.
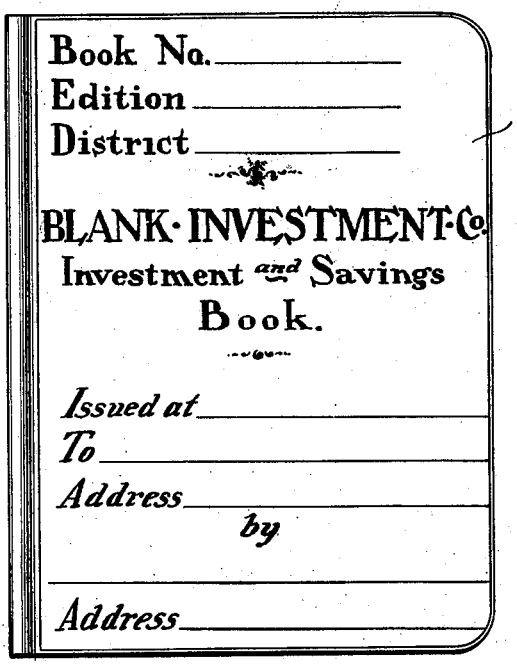

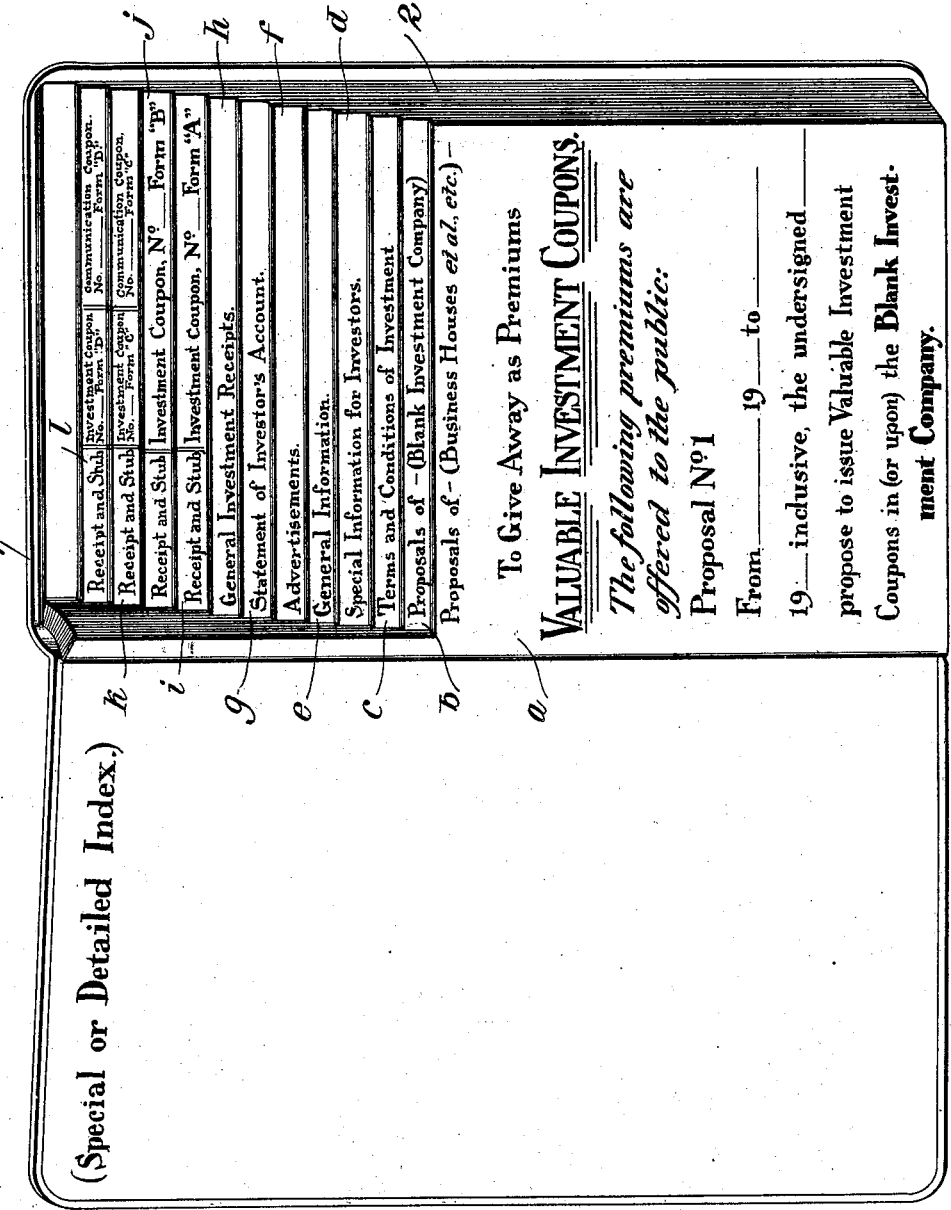

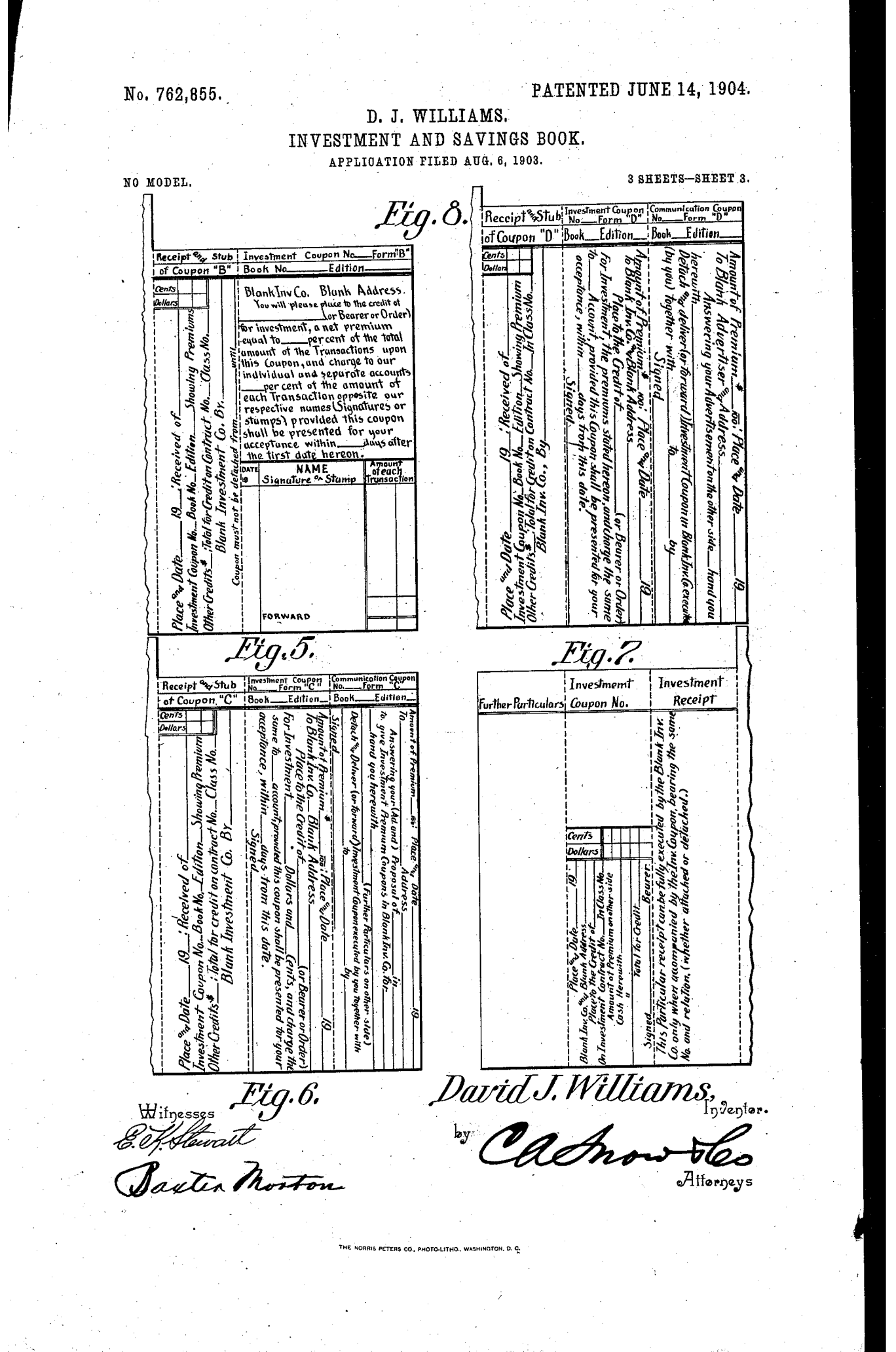

No. 762,855.

PATENTED JUNE 14, 1904.

D. J. WILLIAMS.

INVESTMENT AND SAVINGS BOOK.

APPLICATION FILED AUG. 6, 1903.

NO MODEL.

3 SHEETS—SHEET 3.

Witnesses
E. F. Stewart
Baxter Morton

David J. Williams, Inventor.
by C. A. Snow & Co.
Attorneys

No. 762,855.

Patented June 14, 1904.

UNITED STATES PATENT OFFICE.

DAVID J. WILLIAMS, OF PROVO CITY, UTAH.

INVESTMENT AND SAVINGS BOOK.

SPECIFICATION forming part of Letters Patent No. 762,855, dated June 14, 1904.

Application filed August 6, 1903. Serial No. 168,533. (No model.)

*To all whom it may concern:*

Be it known that I, DAVID J. WILLIAMS, a citizen of the United States, residing at Provo City, in the county of Utah and State of Utah, have invented a new and useful Investment and Savings Book, of which the following is a specification.

This invention relates generally to books for advertising purposes; and it consists in a book in which are combined advertisement-pages, pages of general information, pages of special information, coupons for investment, (which are designed for removal,) record-pages, and proposals of various business establishments setting forth the terms upon which the investment coupons contained in the book may be advantageously employed.

The general object of the invention is to provide a book comprising the features above specified and adapted to take the place of certain forms of advertising now employed by merchants, thereby effecting a saving to the merchants in the cost of such advertisement and at the same time promoting the business of the company issuing the books and stimulating in the persons using the coupons contained in the books a habit and desire to save money and to form valuable investments with money or property that might otherwise be wasted.

The book is designed to serve a triple purpose in benefiting the three classes of persons concerned—viz., the stock-holders of the company issuing the books, the business establishments using it for advertising purposes, and the individuals availing themselves of the coupons contained therein for investment purposes.

With the object above stated and others in view, which will be more fully pointed out as the invention is disclosed in detail, the same consists in the book for advertising purposes hereinafter fully described, illustrated in the accompanying drawings, forming part of this specification, and having the novel features thereof particularly pointed out in the appended claims.

In the drawings, Figure 1 is a view of the book closed, showing the front cover-page of preferred design. Fig. 2 is a view of the book open, showing the general arrangement of the contents thereof and the introductory portion of one of the proposals to give away coupons. Fig. 3 is a view of one of the pages comprising a coupon of form A and a receipt-stub. Fig. 4 is a view of the other side of the leaf shown in Fig. 3. Fig. 5 is a front view of the one of the leaves comprising a coupon of form B. Fig. 6 is a front view of one of the leaves comprising a coupon of form C. Fig. 7 is a view of the other side of the leaf shown in Fig. 6. Fig. 8 is a front view of a leaf comprising a coupon of form D.

Referring to the drawings in detail, 1 designates generally the cover of the book, on the front page of which will be arranged a number of suitably-designated spaces equivalent to those shown in the drawings.

It is to be understood that the Blank Investment Co. is the party issuing the book, and the use of the coupons therein for investment with the Blank Investment Co. is the prime object of the publication of the book. On the inside cover-page a special or detailed index may be placed, if desired, or the space may be used for advertisements.

The body of the book (designated generally as 2) will comprise a suitable number of pages arranged in groups of different length, as shown, to facilitate ready reference to the different sections of the book. Upon the short pages of section *a* of the book will be placed the proposals of business establishments, whether individuals or corporations, to give away to their patrons the coupons contained in the books, and the terms upon which the coupons will be awarded by different classes of business establishments will be fully set forth in these proposals. The exact nature of the proposals need not here be specified, as the terms of award of the coupons may be varied indefinitely without in any way departing from the spirit of the invention. It is sufficient to say that the coupons will be awarded as premiums to the patrons of the establishments in connection with purchases of goods or of services of whatever kind, or they may be offered as prizes in contests of various kinds to attract attention to the houses promoting such contests and offering the prizes therefor.

Following the proposals of business establishments to give away the coupons contained in the book as premiums will be pages forming section b of the book, upon which will be set forth the proposals of the Blank Investment Co., the publishers of the books, to give away the coupons for premiums under various conditions in order to attract attention to the company and take the place of canvassers and other forms of advertising, and will also contain the proposals of the Blank Investment Co. to accept or honor coupons contained in the investment books for credit at their face value and other credits thereon when the coupons are properly and reliably executed in the manner hereinafter to be explained.

Following section b of the book will preferably be a section setting forth the terms and conditions of investment with the Blank Investment Co. and giving in detail the various forms of contract upon which investment coupons will be furnished by the said investment company to business establishments and others desiring to use them and the conditions under which said coupons will be accepted. This section will constitute section c and will be followed by section d, devoted to special information for investors with the Blank Investment Co. and setting forth the facts relating to the investment company which will be of interest or significance to prospective investors.

Section e will preferably be devoted to general information relative to investments and designed to kindle an interest in investment by instalments of savings which might otherwise be wasted.

Section f will be devoted to advertisements, and the advertisements will be preferably composed of special offers to stimulate the use of the coupons contained in the book. It is to be understood in this connection that while section f is to be devoted exclusively to advertisements there will be advertisements interspersed with the other contents of the book throughout, so as to effect an advantageous display of the advertising matter.

The sections of the book heretofore described may be generally grouped as the advertising portions thereof, because the pages thereof are devoted to the presentation of facts designed to stimulate the public in the use of the coupons contained in the book. The remainder of the book will be devoted to coupons of different forms, receipts for the entry of numbers, and other data relating to the coupons used, and suitably-ruled record-pages upon which the various transactions of the party holding the book with the Blank Investment Co. will be entered and from which the status of the account of such party may be readily determined at any time.

Separating the foregoing sections from those that follow will preferably be a sheet of blotting-paper for use in connection with the entries in the investor's account, to which the next section g is devoted. Section h, which follows next in order, will be composed of leaves suitably ruled to form receipts for money or valuable property paid to the Blank Investment Co., and said receipts will be designed to remain permanently in the book. The remaining sections of the book, i, j, k, and l, will be made up of leaves containing coupons and receipt-stubs. These coupons will be of various forms and will preferably conform to two general types.

The first two classes, forms A and B, are intended for use when purchases are made by the purchasers in person, and premiums allowed on the purchases may be entered at the time of purchase in the columns provided therefor. As a specimen of this class of coupon there is illustrated a coupon-page from section i, showing a coupon of form A and the receipt-stub thereof. One of these coupons may be generally described as a credit slip or order from the business establishment signing the coupon upon the Blank Investment Co. instructing that company to credit upon its books to the account of the individual to whom the coupon is issued the amount specified on the coupon and charge the credit to the account of the party signing the coupon. The stub will bear a number of suitably-designated spaces for the entry of data relating to the coupon connected therewith when the coupon is detached from the stub and turned over to the investment company.

The coupons of form B are similar in general features to those of form A, as will be seen from an inspection of Fig. 5. Each of the leaves in section j of the book comprises a coupon of form B and a receipt-stub therefor. The front of the coupon of form B consists of an order upon the Blank Investment Co. to place to the credit of the holder for investment a net premium equal to a certain percentage of the total amount of transactions recorded on the coupon, and the space for recording transactions upon the coupon is arranged for the entry of the amount of each transaction instead of the amount of the premium allowed on each transaction. Similarly, the back of the leaf, which it is deemed unnecessary to illustrate, is provided with suitable spaces for recording transactions, the total of transactions, the percentage upon said total to be allowed as a premium, and the total value of the coupon.

Coupons or forms C and D are designed for use when a purchase is made by mail or messenger instead of by the purchaser in person, and these two forms of coupon are therefore designated "combined communication and investment coupons." These coupons are ordinarily designed to be used in response to an advertisement or proposal from one of the firms whose advertisements or proposals appear in the book, and are provided with space for indicating where such advertisement or proposal was observed in order to show the advertiser which of his advertisements are proving effective. The combined coupons comprise an order-slip or communication coupon for goods or services from a patron to a business establishment and an investment coupon to be executed by said business establishment on receipt of the communication coupon and returned to the patron for deposit by him with the investment company to his own credit.

In Figs. 6 and 7 the front and back of a leaf comprising a coupon of form C are illustrated. As will be seen by examining these figures, the coupon of form C comprises a communication coupon and an investment coupon. The communication coupon is in the nature of a letter to some business establishment giving an order and requesting the execution and delivery of the investment coupon to some individual or concern designated. The investment coupon of form C is merely an order upon the Blank Investment Co. to place to the credit of the party named in the coupon for investment a certain amount and charge the same to a certain account. The back of the leaf comprising a coupon of form C presents a blank space upon the back of that portion of the leaf which constitutes the communication coupon, the blank being left to permit the addition to the letter of particulars not presented on the other side. The back of the portion of the leaf constituting the investment coupon may have a blank left for indorsement and an order from the holder of the coupon to the Blank Investment Co. to place the said coupon to the credit of himself or any other individual named. The receipt portion of the leaf is substantially the same as that employed with other forms of coupons and requires no description.

A leaf comprising a coupon of form D is illustrated in Fig. 8, and from an inspection of said figure it will be noted that this form of coupon is not materially different from the coupon of form C. The only difference worthy of note lies in the communication coupon, in which reference is made to an advertisement appearing upon the other side of the coupon. In the communication coupon of form C the space on the back is left blank for the insertion of additional particulars, but in the coupon of form D the advertisement to which the communication coupon is an answer is displayed upon the back of the coupon. As the advertisement may be of any form whatever and of any suitable character, illustration of the back of the leaf (shown in Fig. 8) is deemed unnecessary.

The combined communication and investment coupons are associated with receipt-stubs, as are the other coupons, and it is intended that at the time of presentation of the investment portion of the coupon the stub forming the receipt therefor will be properly filled out by the investment company or one of its officers.

It is to be understood in connection with the above explanation of the use of the coupons contained in the book that the coupons are not convertible at once into cash, as such conversion of the coupons would defeat the prime object of the publication of the book. The coupons are receivable by the investment company under the terms of their various contracts with business establishments in lieu of cash for investment purposes, and none of the profits of such investment are to be withdrawn until after the lapse of a period of time which will be determined by the investment company and specified in its proposals. It is, however, understood that the coupons may be negotiable either before or after deposit with the investment company, and as such will constitute valuable assets, and while not causing the withdrawal of funds from the possession of the investment company will enable the holders thereof to secure cash thereon if necessary. It is also to be understood that in order to cause the general use of the coupons they will be sold to business houses in most cases at a discount, the amount of the discount depending, as usual, upon the magnitude of the order therefor, and the said business houses will agree in return to make use of a certain number of coupons or coupons aggregating a certain amount in value within a certain specified time.

The coupon-books containing the blank coupons are intended for free distribution and will be supplied either directly by the investment company to the public or by the parties making use of the coupons under contract with the investment company, or the coupon-books will be distributed by both methods.

It is therefore to be understood that in the foregoing paragraph where it is said that the coupons will be sold to business establishments it is not meant that the blank coupons will be actually sold to them, but that contracts will be made in consideration of a certain sum to accept and honor coupons executed by such business establishments up to a certain specified amount, and the coupons will be without intrinsic value except as executed by business establishments having contracts with the Blank Investment Co.

By distributing such books widely the business establishments using them will secure a most effective and steady advertisement and the holders of the coupon-books will be stimulated to make savings and form valuable investments by patronizing establishments proposing to give away the coupons as premiums, while the Blank Investment Co. as the publishers of the coupon-books and the firm receiving the money paid by business establishments that purchase the coupons to offer them as premiums will benefit largely from the money so received.

Having thus described the nature and object of my invention, what I claim as new, and desire to secure by Letters Patent, is—

1. The combination in a book of the class described, of pages bearing proposals from business houses to give investment coupons as premiums, pages bearing proposals from an investment company to receive properly-executed coupons in lieu of cash for investment, advertising-pages, and pages constituting the coupons specified in the proposals, said pages bearing matter in the nature of orders upon the investment company.

2. The combination in a book of the class described, of pages bearing proposals from business establishments to give investment coupons as premiums, pages bearing proposals from an investment company to receive properly-executed coupons in lieu of cash for investment and pages each comprising a stub and a removable portion separated from the stub portion by a weakened line, the removable portions constituting the coupons specified in the proposals and bearing matter in the nature of orders upon the investment company, and the stubs bearing appropriately-designated spaces for recording data pertaining to the coupons associated therewith.

3. The combination in a book of the class described of pages bearing proposals from business establishments to give coupons as premiums, pages bearing proposals from an investment company to receive properly-executed coupons in lieu of cash for investment, pages comprising each a portion constituting one of the coupons specified in the proposals and bearing matter in the nature of an order upon the investment company and a receipt-stub bearing appropriately-designated spaces for the entry of data pertaining to the coupon associated therewith, and pages suitably ruled for keeping a record of the transactions of the owner of the book with the investment company whose proposals appear therein.

4. The combination in a book of the class described of pages bearing proposals from business establishments to give investment coupons as premiums, pages bearing proposals from an investment company to receive properly-executed coupons in lieu of cash for investment, and pages each comprising a portion forming a coupon as specified in the proposals and bearing matter in the nature of an order upon the investment company and an order-slip upon the business establishment proposing to give investment coupons to its patrons.

In testimony that I claim the foregoing as my own I have hereto affixed my signature in the presence of two witnesses.

DAVID J. WILLIAMS.

Witnesses:
T. C. LARSON,
J. W. DANGERFIELD.